United States Patent
Shao et al.

(10) Patent No.: US 11,985,194 B2
(45) Date of Patent: May 14, 2024

(54) METHODS AND INTERNET OF THINGS SYSTEMS FOR PREDICTING FILTER ELEMENT REPLACEMENT AT GATE STATION FOR SMART GAS

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Bin Liu, Chengdu (CN); Lei Zhang, Chengdu (CN); Guanghua Huang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/066,249

(22) Filed: Dec. 14, 2022

(65) Prior Publication Data

US 2023/0118293 A1    Apr. 20, 2023

(30) Foreign Application Priority Data

Nov. 14, 2022    (CN) .......................... 202211417216.9

(51) Int. Cl.
   *H04L 67/12*    (2022.01)
   *G16Y 10/35*    (2020.01)
   *G16Y 20/20*    (2020.01)

(52) U.S. Cl.
   CPC .............. *H04L 67/12* (2013.01); *G16Y 10/35* (2020.01); *G16Y 20/20* (2020.01)

(58) Field of Classification Search
   CPC .......... H04L 67/12; G16Y 20/20; G16Y 10/35
   See application file for complete search history.

(56) References Cited

U.S. PATENT DOCUMENTS

2007/0056272 A1    3/2007    Dollmeyer et al.
2011/0308308 A1*   12/2011   Herman ................. F02M 35/09
                                                       73/114.31
(Continued)

FOREIGN PATENT DOCUMENTS

CN    1930379 A    3/2007
CN    102628386 A   8/2012
(Continued)

OTHER PUBLICATIONS

Kuruta et al., JP2021163158A, 2020, Computer program, learning model generation method, gas filter state monitoring method, and gas filter state monitoring device, English translation downloaded from Espacenet on Aug. 16, 2023 (Year: 2020).*
(Continued)

*Primary Examiner* — Mohamed Charioui
*Assistant Examiner* — Lyudmila Zaykova-Feldman
(74) *Attorney, Agent, or Firm* — METIS IP LLC

(57) ABSTRACT

The embodiments of the present disclosure provide a method for predicting a gate station filter replacement at a gate station for smart gas and an Internet of Things system. The method includes: obtaining, by a smart gas data center, usage information of a filter element through a smart gas sensor network platform, the usage information at least including at least one of ventilation efficiency of the filter element, filtered impurity information, and a blockage degree; obtaining, by a smart gas pipeline network device management sub-platform, the usage information from the smart gas data center, determining a filter element maintenance plan based on the usage information, and sending the filter element maintenance plan to the smart gas data center; and sending, by the smart gas data center, the filter element maintenance plan to a smart gas user platform through a smart gas service platform.

7 Claims, 5 Drawing Sheets

(56) References Cited

U.S. PATENT DOCUMENTS

| | | |
|---|---|---|
| 2012/0288410 A1 | 11/2012 | Takayanagi |
| 2014/0351187 A1* | 11/2014 | Halim .................... G01K 17/00 |
| | | 706/21 |
| 2015/0020507 A1 | 1/2015 | Sun, Jr. et al. |
| 2017/0173505 A1 | 6/2017 | Dhingra et al. |
| 2018/0161709 A1 | 6/2018 | Cheng et al. |
| 2020/0309632 A1* | 10/2020 | Shao ........................ G01D 18/00 |
| 2023/0116964 A1* | 4/2023 | Sun .......................... F24F 11/63 |
| | | 700/276 |
| 2023/0119842 A1* | 4/2023 | Gourvenec ........ G05B 23/0283 |
| | | 702/34 |

FOREIGN PATENT DOCUMENTS

| | | | |
|---|---|---|---|
| CN | 104361218 A | | 2/2015 |
| CN | 104807144 A | * | 7/2015 |
| CN | 105276687 A | | 1/2016 |
| CN | 204961119 U | | 1/2016 |
| CN | 105363298 A | | 3/2016 |
| CN | 107120751 A | | 9/2017 |
| CN | 107622313 A | | 1/2018 |
| CN | 107883538 A | | 4/2018 |
| CN | 108007837 A | | 5/2018 |
| CN | 109854334 A | | 6/2019 |
| CN | 110195911 A | | 9/2019 |
| CN | 110400125 A | | 11/2019 |
| CN | 110619361 A | | 12/2019 |
| CN | 111425303 A | | 7/2020 |
| CN | 113155708 A | | 7/2021 |
| CN | 214794368 U | | 11/2021 |
| CN | 114239309 A | | 3/2022 |
| CN | 114542338 A | | 5/2022 |
| CN | 114819199 A | | 7/2022 |
| CN | 115330094 A | | 11/2022 |
| CN | 115330361 A | | 11/2022 |
| DE | 102022211726 A1 | * | 6/2023 |
| FR | 2936838 A1 | | 4/2010 |
| JP | 2018153737 A | | 10/2018 |
| JP | 2021163158 A | * | 10/2021 |
| JP | 2021163158 A | | 10/2021 |
| WO | 2021241703 A1 | | 12/2021 |

OTHER PUBLICATIONS

Chen et al., CN104807144A, 2015, Cloud control platform of intelligent indoor air purification fresh air system based on Internet of Things, English translation downloaded from Espacenet on Aug. 16, 2023 (Year: 2015).*

Dsouza et al., 2022, DE102022211726A1, Method for training an artificial intelligence (AI) model and determining remaining useful life of a filter, English translation downloaded from Espacenet on Aug. 16, 2023 (Year: 2022).*

First Office Action in Chinese Application No. 202211417216.9 dated Jan. 4, 2023, 29 pages.

Chen, Shijie et al., Research on Test Technology of Intake Air Smoothness and Robustness for Air Filter Element, Automobile Technology, 49-53, 2017.

Lang, Qingyang et al., Design and Research of Filtration Device with Cartridge Life Monitoring Function, Science and Technology Wind, 2019, 5 pages.

Notification to Grant Patent Right for Invention in Chinese Application No. 202211417216.9 dated Feb. 6, 2023, 8 pages.

Lu, Jinjun et al., Simulation and Experimental Study on Paper Folding Filtration Process of Air Filter, Vehicle & Power Technology, 3: 19-23, 2020.

Xiao, Lian et al., Performance Test of Filter Cartridge for Natural Gas Purification, China Petroleum Machinery, 43(12): 81-85, 2015.

Ba, Peng et al., Research on Prognosis Plan of Stainless Steel Filter Core in Hydraulic Pipelines, Lubrication Engineering, 36(11): 83-66, 2011.

* cited by examiner

METHODS AND INTERNET OF THINGS SYSTEMS FOR PREDICTING FILTER ELEMENT REPLACEMENT AT GATE STATION FOR SMART GAS

CROSS-REFERENCE TO RELATED DISCLOSURES

This application claims the priority of the Chinese application with the application No. 202211417216.9, filed on Nov. 14, 2022, the entire content of the above application is incorporated herein by reference.

TECHNICAL FIELD

The present disclosure relates to the field of gas devices, and in particular to a method and an Internet of Things system for predicting a filter element replacement at a gate station for smart gas.

BACKGROUND

A gas filter is an indispensable device on a pipeline of conveying medium, which can be used to eliminate impurities in the medium (such as natural gas, artificial gas, liquefied gas, and other non-corrosive gases, etc.) to protect a normal usage of valves and devices and reduce device maintenance costs. Filters are usually installed on the inlet side of pressure-reducing valves, pressure relief valves, positioning valves, or other devices. When fluid enters a filter with a filter element, its impurities are blocked by the filter element, and clean filter gas is discharged from the filter outlet. When cleaning is required, a filter cartridge may be disassembled, the filter element may be taken out, and then re-installed after cleaning. Different gas sources or different types of filter elements may have different replacement cycles due to different working conditions.

Therefore, there is a need for a method and an Internet of Things system for predicting a filter element replacement at a gate station for smart gas, so as to realize timely maintenance of the filter element, and ensure the normal operation of the filter element and the normal gas supply of the gate station.

SUMMARY

One of the embodiments of the present disclosure provides a method for predicting gate station a filter replacement at a gate station for smart gas. The method is implemented by an Internet of Things system. The Internet of Things system includes a smart gas user platform, a smart gas service platform, a smart gas device management platform, a smart gas sensor network platform and a smart gas object platform that interact in sequence, the smart gas device management platform includes a smart gas data center and a smart gas pipeline network device management sub-platform, and the method is executed by the smart gas device management platform. The method comprises: obtaining, by the smart gas data center, usage information of the filter element through the smart gas sensor network platform, the usage information at least including at least one of ventilation efficiency of the filter element, filtered impurity information, and a blockage degree; obtaining, by the smart gas pipeline network device management sub-platform, the usage information from the smart gas data center, determining a filter element maintenance plan based on the usage information, and sending the filter element maintenance plan to the smart gas data center; sending, by the smart gas data center, the filter element maintenance plan to the smart gas user platform through the smart gas service platform.

One of the embodiments of the present disclosure provides an Internet of Things system for predicting a filter replacement at a gate station for smart gas. The Internet of Things system includes a smart gas user platform, a smart gas service platform, a smart gas device management platform, a smart gas sensor network platform, and a smart gas object platform that interact in sequence, and the smart gas device management platform includes a smart gas data center and a smart gas pipeline network device management sub-platform. The smart gas device management platform is configured to: obtain, by the smart gas data center, usage information of the filter element through the smart gas sensor network platform, the usage information at least includes at least one of ventilation efficiency of the filter element, filtered impurity information, and a blockage degree; obtain, by the smart gas pipeline network device management sub-platform, the usage information from the smart gas data center, determine a filter element maintenance plan based on the usage information, and send the filter element maintenance plan to the smart gas data center; and send, by the smart gas data center, the filter element maintenance plan to the smart gas user platform through the smart gas service platform.

One of the embodiments of the present disclosure provides a non-transitory computer-readable storage medium, the storage medium stores computer instructions, and after the computer reads the computer instructions in the storage medium, the computer executes the above method for predicting the filter element replacement at the gate station for smart gas.

BRIEF DESCRIPTION OF THE DRAWINGS

The present disclosure will be further described by way of example embodiments, which will be described in detail with reference to the accompanying drawings. These examples are not limiting, and in these examples, the same numbers refer to the same structures, wherein.

DETAILED DESCRIPTION

In order to illustrate the technical solutions of the embodiments of the present disclosure more clearly, the following briefly introduces the accompanying drawings used in the description of the embodiments. Obviously, the drawings in the following description are only some examples or embodiments of the present disclosure. For those of ordinary skill in the art, the present disclosure may also be applied to other similar situations according to these drawings without any creative effort. Unless obvious from the locale or otherwise specified, the same reference numbers in the figures represent the same structure or operation.

It should be understood that "system", "device", "unit" and/or "module" as used herein is a method used to distinguish different components, elements, parts, sections, or assemblies at different levels. However, other words may be replaced by other expressions if they serve the same purpose.

As shown in the present disclosure and claims, unless the context clearly dictates otherwise, the words "a", "an", and/or "the" are not intended to be specific in the singular and may include the plural. Generally speaking, the terms "comprising" and "including" only imply that the clearly identified steps and elements are included, and these steps and elements do not constitute an exclusive list, and the method or apparatus may also include other steps or elements.

Flowcharts are used in the present disclosure to illustrate operations performed by a system according to an embodiment of the present disclosure. It should be understood that the preceding or following operations are not necessarily performed in the exact order. On the contrary, the steps may be processed in reverse order or simultaneously. At the same time, other actions may be added to these procedures, or a step or steps may be removed from these procedures.

Figure 1:
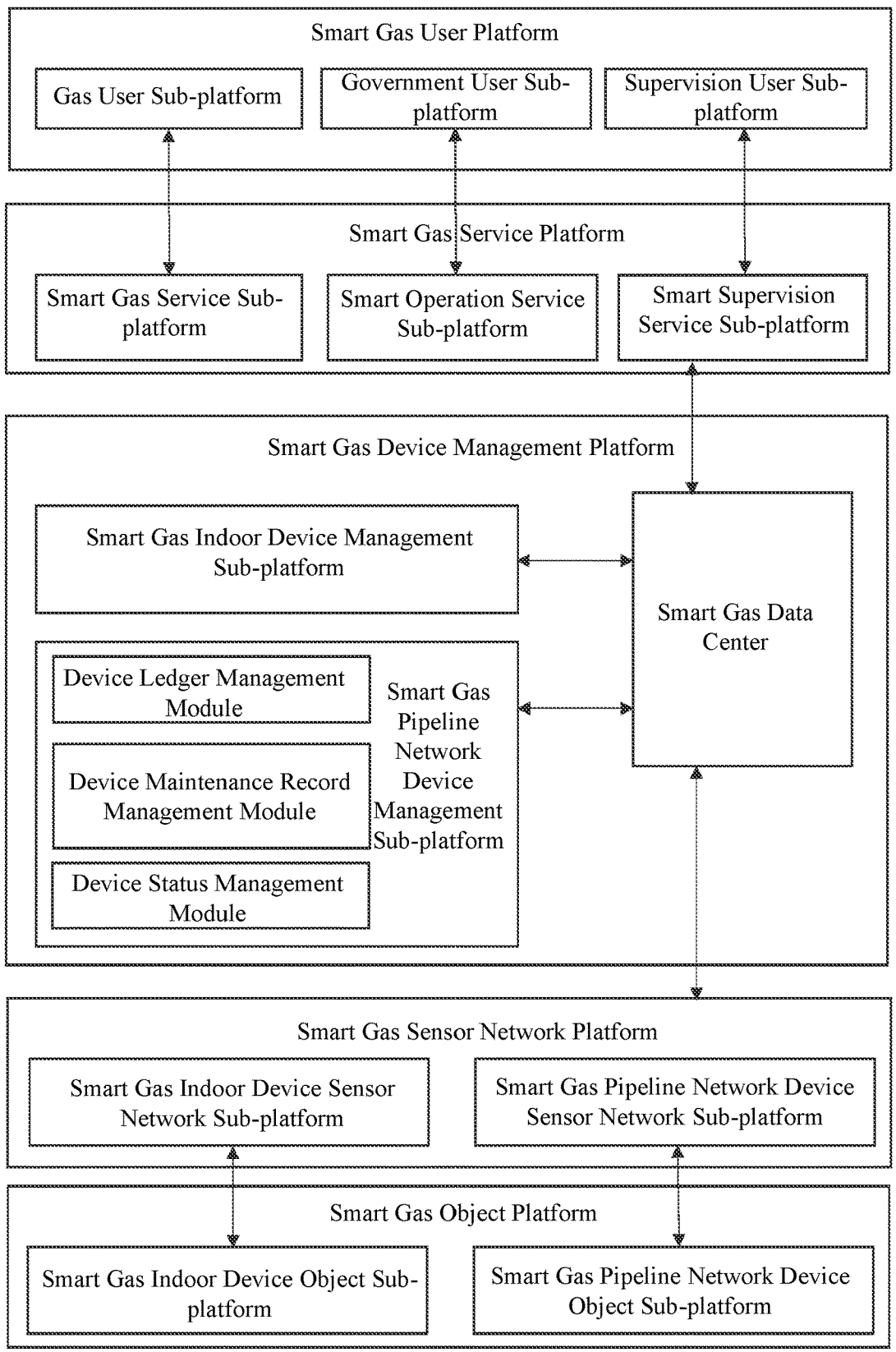
FIG. 1 is an exemplary schematic diagram of an Internet of Things system for predicting a filter element replacement at a gate station for smart gas according to some embodiments of the present disclosure.

FIG. 1 is an exemplary schematic diagram of an Internet of Things system for predicting a filter element replacement at a gate station for smart gas according to some embodiments of the present disclosure. As shown in FIG. 1, the Internet of Things system for predicting the filter element replacement at the gate station for smart gas includes a smart gas user platform, a smart gas service platform, a smart gas device management platform, a smart gas sensor network platform, and a smart gas object platform that interact in sequence.

The smart gas user platform is a user-oriented platform. In some embodiments, the smart gas user platform is configured as a terminal device. For example, the terminal device may include a laptop computer, a mobile phone, and other intelligent electronic devices that implement data processing and data communication, which may not be limited here. In some embodiments, the smart gas user platform may interact with the smart gas service platform, and may be used to receive a gas device maintenance plan (such as a filter element maintenance plan, etc.) transmitted by the smart gas service platform, and may also be used to issue a query instruction of gas device maintenance plan to the smart gas service platform.

In some embodiments, the smart gas user platform may include a gas user sub-platform, a government user sub-platform, a supervision user sub-platform, or the like. Gas users may be users who use gas, government users may be users who provide gas operation services, and supervision users may be users who supervise safety of gas use (also referred to as gas usage). In some embodiments, the gas user sub-platform may be used to receive information related to gas devices transmitted by the smart gas service sub-platform, such as gas device overhauls or safe gas use reminders, etc., and may also be used to transmit the gas consumption query command to the smart gas service sub-platform. In some embodiments, the government user sub-platform may receive information related to gas operation transmitted by a smart operation service sub-platform. In some embodiments, the supervision user sub-platform may be used to receive gas device operation management information or gas safety operation information transmitted by a smart supervision service sub-platform, such as usage situation of the filter element of the gate station filter, and may also be used to transmit the query instruction of the gas device maintenance plan to the smart supervision service sub-platform.

The smart gas service platform may be a platform for receiving and transmitting data and/or information. In some embodiments, the smart gas service platform may interact upwards with the smart gas user platform, for example, the smart gas service platform may receive the query instruction of gas device maintenance plan issued by the smart gas user platform; and upload the gas device maintenance plan to the smart gas user platform, etc. In some embodiments, the smart gas service platform may also interact downward with the smart gas device management platform, for example, the smart gas service platform may issue the query instruction of the gas device maintenance plan to the smart gas data center; and receive the gas device maintenance plan uploaded by the smart gas data center, etc.

In some embodiments, the smart gas service platform may include a smart gas service sub-platform, a smart operation service sub-platform, a smart supervision service sub-platform, or the like. The smart gas service sub-platform may correspond to the gas user sub-platform to provide gas users with query services for information related to gas usage. For example, gas users may query information such as gas consumption and gas fees through the smart gas service sub-platform. The smart operation service sub-platform may correspond to the government user sub-platform to provide government users with query services for information related to gas operation. For example, government users may query one-month total gas revenue and other information through the smart operation service sub-platform. The smart supervision service sub-platform may correspond to the supervision user sub-platform to provide supervision users with query services for information related to safety supervision. For example, supervision users may query information such as gas device maintenance plans through the smart supervision service sub-platform.

The smart gas device management platform may be used to coordinate, manage, and analyze the gas-related data in a smart gas pipeline network (such as the usage situation of the filter element of the gate station filter, etc.).

In some embodiments, the smart gas device management platform may interact upwards with the smart gas service platform, for example, the smart gas device management platform may receive the query instruction of gas device maintenance plan issued by the smart gas service platform; and upload the gas device maintenance plan to the smart gas service platform, etc.

In some embodiments, the smart gas device management platform may interact downward with the sensor network platform, for example, the smart gas device management platform may issue the query instruction of the gas device maintenance plan to the smart gas sensor network sub-platform; and receive data related to the gas device uploaded by the smart gas sensor network sub-platform (such as the usage situation of the filter element of the gate station filter, etc.).

In some embodiments, the smart gas device management platform may include a smart gas indoor device management sub-platform, a smart gas pipeline network device management sub-platform, a smart gas data center, or the like. The smart gas indoor device management sub-platform and the smart gas pipeline network device management sub-platform are independent of each other. The smart gas indoor device management sub-platform and the smart gas pipeline network device management sub-platform may interact with the smart gas data center in two directions, for example, the smart gas indoor device management sub-platform and the smart gas pipeline network device management sub-platform may obtain and provide feedback data from the smart gas data center.

The smart gas indoor device management sub-platform is used to maintain and manage the indoor device of gas users (for example, gas meters, gas valves, etc.).

The smart gas pipeline network device management sub-platform is used to maintain and manage pipeline network devices (for example, gate station filters, gas flow meters, etc.). In some embodiments, the smart gas pipeline network device management sub-platform may include a device ledger management module, a device maintenance record management module, and a device status management module. The device ledger management module may be configured to achieve diversified management of indoor devices by dividing category and region, and extracting basic information such as a type, a specification, a number, a location, etc., of a pipeline network device from the smart gas data center, as well as operation information such as an installation time, an operation time, etc. The device maintenance record management module may be configured to manage maintenance records of the pipeline network device, and extract the conservation records, repair records, and inspection records of the pipeline network device from the smart gas data center, and realize an upgrade management of device firmware. The device status management module may be configured to query a current operation status and an expected usage life of the indoor device. In some embodiments, the smart gas pipeline network device management platform may maintain the filter element of the gate station filter through the smart gas data center, including following operations. The smart gas data center receives the query instruction about the filter element maintenance plan issued by the smart gas service platform. Based on the query instruction, the smart gas data center obtains the data related to the filter element (such as the usage information of the filter element, etc.) from the smart gas pipeline network device object sub-platform through the smart gas pipeline network device sensor network sub-platform, and sends the data to the smart gas network device management sub-platform for analysis and processing. Different types of information may be analyzed and processed through different modules of the above-mentioned smart gas pipeline network device management sub-platform. The smart gas pipeline network device management sub-platform sends the analyzed and processed data (such as the filter element maintenance plan, etc.) to the smart gas data center. The smart gas data center sends the processed data to the smart gas user platform through the smart gas service platform.

The smart gas data center is a platform for aggregating and storing various data, information, instructions, etc. For example, the smart gas data center may store management data of various indoor devices and pipeline network devices, maintenance plans of various devices and other information, various query instructions issued by users, etc. In some embodiments, the smart gas device management platform may exchange information with the corresponding service sub-platform and sensor network sub-platform through the smart gas data center.

The smart gas sensor network platform may be configured as a communication network and gateway. In some embodiments, the smart gas sensor network platform may interact upwards with the smart gas device management platform, for example, the smart gas sensor network platform may receive the query instruction of the gas device maintenance plan issued by the smart gas data center, upload the data related to the gas device to the smart gas data center, etc. In some embodiments, the smart gas sensor network platform may interact downward with the smart gas object platform, for example, the smart gas sensor network platform may issue the query instruction of the gas device maintenance plan to the smart gas object platform, receive the data related to the gas device uploaded by the smart gas object platform, etc.

In some embodiments, the smart gas sensor network platform may include a smart gas indoor device sensor network sub-platform and a smart gas pipeline network device sensor network sub-platform. The smart gas indoor device sensor network sub-platform may interact with the smart gas indoor device object sub-platform to obtain the data related to the indoor device (for example, data related to a gas meter, etc.). The smart gas pipeline network device sensor network sub-platform may interact with the smart gas pipeline network device object sub-platform to obtain data related to the pipeline network device (for example, data related to the filter element, etc.).

The smart gas object platform may be used to obtain gas-related data in the smart gas pipeline network. In some embodiments, the smart gas object platform may interact upwards with the smart gas sensor network platform, for example, the smart gas object platform may receive the query instruction of the gas device maintenance plan issued by the smart gas sensor network platform, and upload the data related to the gas device to the smart gas sensor network platform.

In some embodiments, the smart gas object platform may include a smart gas indoor device object sub-platform and a smart gas pipeline network device object sub-platform. The indoor device is a device included in a place where the gas user is located (for example, a gas meter, a gas valve, etc.). The pipeline network device is a device included in the gas pipeline network (for example, a gate station filter element of a gate station, a gas flow meter, etc.).

In some embodiments, the smart gas indoor device object sub-platform may interact with the smart gas indoor device sensor network sub-platform, and the data related to the indoor device may be uploaded to the smart gas data center through the smart gas indoor device sensor network sub-platform. The smart gas pipeline network device object sub-platform may interact with the smart gas pipeline network device sensor network sub-platform, and the data related to the pipeline network device (such as the data related to the filter element of the gate station, etc.) may be uploaded to the smart gas data center through the smart gas pipeline network device sensor network sub-platform.

It should be noted that the above description of the Internet of Things system for predicting the filter element replacement at the gate station for smart gas and its internal modules may be only for convenience of description, and may not limit the description to the scope of the embodiments. It may be understood that for those skilled in the art, after understanding the principle of the system, various modules may be combined arbitrarily, or a sub-system may be formed to connect with other modules without departing from the principle.

Figure 2:
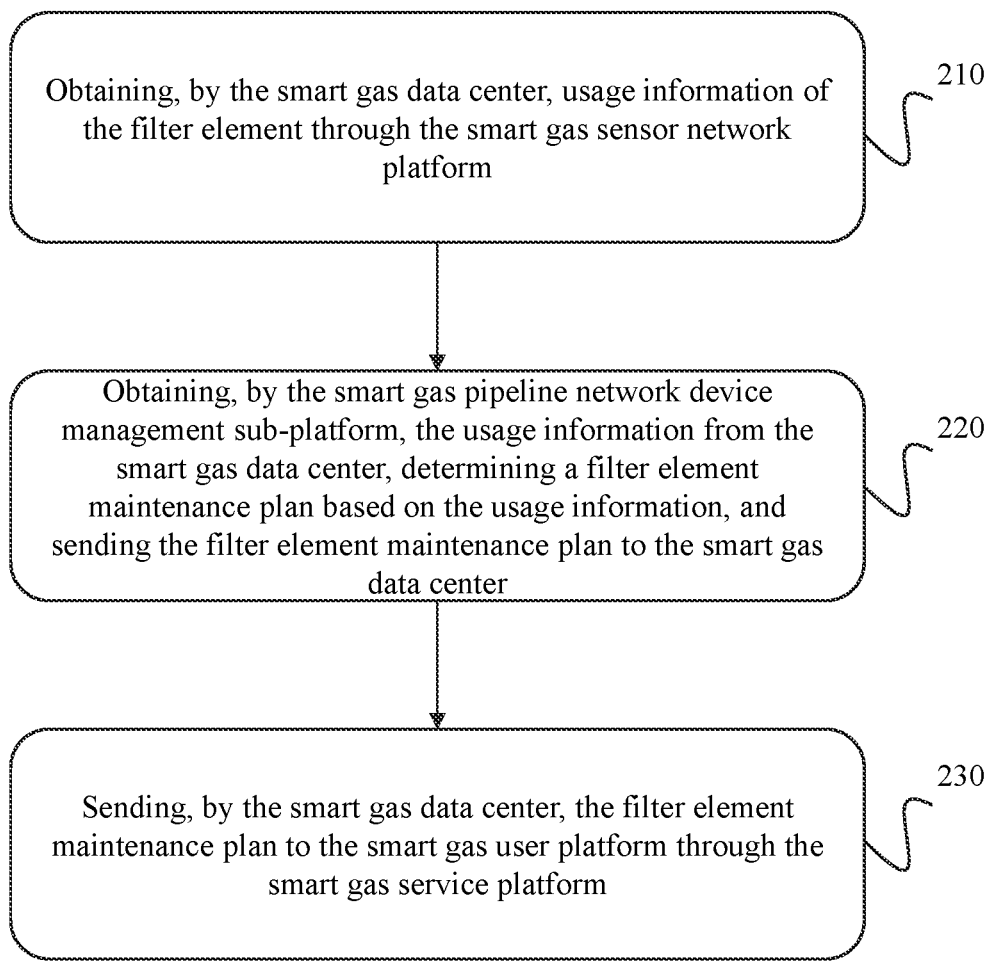
FIG. 2 is a flowchart illustrating an exemplary process of a method for predicting the filter element replacement at the gate station for smart gas according to some embodiments of the present disclosure.

FIG. 2 is a flowchart illustrating an exemplary process of a method for predicting a filter element replacement at a gate station for smart gas according to some embodiments of the present disclosure. As shown in FIG. 2, process 200 includes the following steps. In some embodiments, process 200 may be performed by a smart gas device management platform.

Step 210, obtaining, by the smart gas data center, usage information of the filter element through the smart gas sensor network platform.

The filter element may refer to a filter element of a filter. The filter may be used to eliminate impurities in the medium on a medium conveying pipeline to protect the normal usage of valves and devices. In some embodiments, the filter may include a gas filter. The gas filter may filter natural gas, artificial gas, liquefied gas, and other non-corrosive gases.

In some embodiments, the usage information includes at least one of ventilation efficiency of the filter element, filtered impurity information, and a blockage degree.

The ventilation efficiency of the filter element refers to an amount of gas passing through the filter element in a unit time, for example, 30 cubic meters per minute, etc.

In some embodiments, the smart gas pipeline network device management sub-platform may obtain the ventilation efficiency of the filter element based on a pressure difference between a gas inlet and a gas outlet of the filter element. The pressure difference refers to a difference between a pressure of the gas inlet of the filter element and a pressure of gas outlet of the filter element. The greater the pressure difference is, the harder the gas is to pass through the filter element, and the lower the ventilation efficiency is. In some embodiments, the smart gas object platform may detect the pressure of the gas inlet and gas outlet based on a built-in sensor (e.g., a gas pressure sensor), and then determine the pressure difference.

In some embodiments, the smart gas pipeline network device management sub-platform may determine a corresponding relationship between the ventilation efficiency of the filter element and the pressure difference in advance based on historical ventilation efficiency of the filter element and a historical pressure difference of the corresponding gas inlet and gas outlet. Correspondingly, the smart gas pipeline network device management sub-platform may determine the ventilation efficiency of the filter element based on the current pressure difference between the gas inlet and gas outlet of the filter element and the corresponding relationship.

The filtered impurity information refers to information related to impurities that have been filtered out by the filter element. For example, the filtered impurity information includes a type of impurity, a particle size of the impurity, or the like. In some embodiments, the filtered impurity information may include an accumulated amount of impurity filtering. The accumulated amount of impurity filtering refers to a total amount of impurities that have been filtered out by the filter element.

In some embodiments, the accumulated amount of impurity filtering may be determined based on usage duration of the filter element. The usage duration refers to a duration from the time when the filter element was replaced for last time to the current time. For example, the usage duration of the filter element may be obtained by a time recorder configured in the smart gas object platform.

In some embodiments, the smart gas pipeline network device management sub-platform may generate a mapping table of the accumulated amount of impurity filtering in advance based on historical usage duration of a same filter element or a same type of filter element and a corresponding historical accumulated amount of impurity filtering. Furthermore, the historical accumulated amount of impurity filtering corresponding to the historical usage duration that is the same as or similar to the usage duration of the current filter element may be used as the accumulated amount of impurity filtering corresponding to the current usage duration.

In some embodiments, the smart gas pipeline network device management sub-platform may further determine the accumulated amount of impurity filtering based on an impurity prediction model, and the impurity prediction model is a machine learning model. For more details on determining the accumulated amount of impurity filtering based on the impurity prediction model, please refer to FIG. 3 and its related descriptions thereof.

In some embodiments of the present disclosure, the ventilation efficiency of the filter element may be obtained through the pressure difference between the gas inlet and gas outlet of the filter element, so as to determine an actual working condition of the filter element, which provides a precision basis for subsequent judgments on whether to clean or replace the filter element.

The blockage degree may refer to a degree to which the filter element is blocked by impurity. The blockage degree may be expressed at different levels, for example, "low", "medium", "high", etc. The blockage degree may be expressed numerically. For example, the blockage degree may be expressed as a number in the range of 0-10. The higher the value corresponding to the blockage degree is, the more serious the blockage degree may be.

In some embodiments, the smart gas pipeline network device management sub-platform may determine the blockage degree based on preset rules. The preset rules may include the corresponding relationship between the blockage degree and the ventilation efficiency of the filter element. For example, the smart gas pipeline network device management sub-platform may preset a ventilation efficiency threshold of the filter element, and the ventilation efficiency threshold may include a first threshold and a second threshold, and the second threshold is higher than the first threshold. For example, when the ventilation efficiency of the filter element is greater than or equal to the second threshold, the blockage degree may be 0. When the ventilation efficiency of the filter element is greater than or equal to the first threshold and less than the second threshold, the blockage degree may be 1. When the filter element ventilation efficiency is less than the first threshold, the blockage degree may be 2. It should be understood that the lower the ventilation efficiency of the filter element is, the higher the blockage degree is.

In some embodiments, the smart gas pipeline network device management sub-platform may further determine the blockage degree based on a blockage prediction model, and the blockage prediction model is a machine learning model. For more details on determining the blockage degree based on the blockage prediction model, please refer to FIG. 4 and related descriptions thereof.

In some embodiments, the usage information of the filter element may also include a cleaning cost. The cleaning cost refers to an economic cost of cleaning the filter element. In some embodiments, the higher the blockage degree is, or the longer the usage duration is, the higher the cleaning cost may be. For example, cleaning a normal filter element may cost 100 yuan. If the filter element is seriously blocked, the cleaning cost may be increased to 190 yuan. If the filter element is used for a long time, and a conventional cleaning method is easy to directly damage the filter element, the cleaning cost may be increased to 200 yuan.

In some embodiments, the smart gas pipeline network device management sub-platform may determine the cleaning cost by adopting various data analysis algorithms, such as vector similarity analysis method, cluster analysis method, regression analysis method, etc.

In some embodiments, the smart gas pipeline network device management sub-platform may determine the cleaning cost based on a cost prediction model, and the cost prediction model is a machine learning model. For more details on determining the cleaning cost based on the cost prediction model, please refer to FIG. 5 and its related description thereof.

Step 220, obtaining, by the smart gas pipeline network device management sub-platform, the usage information from the smart gas data center, determining a filter element maintenance plan based on the usage information, and sending the filter element maintenance plan to the smart gas data center.

The filter element maintenance plan refers to a plan to maintain the filter element. In some embodiments, the filter element maintenance plan may include whether to clean the filter element, whether to replace the filter element, a last filter element replacement day, a last filter element cleaning day, a next filter element replacement day, a next filter element cleaning day, or the like.

In some embodiments, the smart gas pipeline network device management sub-platform may determine a filter element maintenance plan by analyzing and processing usage information using preset rules, various data analysis algorithms, and/or manual experience.

In some embodiments, the smart gas device management sub-platform may determine the filter element maintenance plan based on the accumulated amount of impurity filtering.

In some embodiments, when the accumulated amount of impurity filtering is within a certain preset range, the smart gas device management sub-platform may determine a preset maintenance operation (i.e., whether to clean or replace the filter element) corresponding to the preset range according to the preset range of the accumulated amount of impurity filtering. Merely by way of example, when the accumulated amount of impurity filtering is between 0 and 500 g, the preset maintenance operation may be no need to clean nor replace the filter element. When the accumulated amount of impurity filtering is between 500 and 1000 g, the preset maintenance operation may be the need to clean but no need to replace the filter element. When the accumulated amount of impurity filtering is greater than 1000 g, the preset maintenance operation may be the need to replace the filter element.

In some embodiments of the present disclosure, by analyzing the accumulated amount of impurity filtering, it may determine whether to clean or replace the filter element in combination with the actual usage condition of the filter element, so as to ensure the normal operation of the filter element and save costs.

In some embodiments, the smart gas pipeline network device management sub-platform may determine a replacement cycle of the filter element based on the accumulated amount of impurity filtering, an accumulated amount threshold, and a usage duration of the filter element; and determine the filter element maintenance plan based on the replacement cycle.

The accumulated amount threshold refers to a maximum value of the accumulated amount of impurity filtering of the filter element. When the accumulated amount of impurity filtering reaches the accumulated amount threshold, the filter element may be blocked, affecting the filtering performance of the filter element. The accumulated amount threshold may be a system default value, an experience value, an artificial preset value, or the like, or any combination thereof, and may be set according to actual needs.

The replacement cycle refers to the length of time from the time when the filter element starts to work to the time when the filter element is replaced. For example, the replacement cycle may be calculated by the following formula (1):

$$T = t \times m/n \qquad (1)$$

where T denotes the replacement cycle, t denotes the actual usage duration, m denotes the accumulated amount threshold, and n denotes the accumulated amount of impurity filtering.

In some embodiments, the smart gas pipeline network device management sub-platform may determine the filter element maintenance plan based on the usage duration and the replacement cycle. For example, when the usage duration is greater than or equal to the replacement cycle, it may be determined that the filter element needs to be replaced. When the usage duration is less than the replacement cycle and reaches a certain preset threshold (e.g., 50% of the replacement cycle), it may be determined that the filter element does not need to be replaced, but needs to be cleaned. When the usage duration is less than the replacement cycle and does not reach a certain preset threshold, it may be determined that the filter element does not need to be cleaned.

In some embodiments, after the smart gas pipeline network device management sub-platform determines the filter element maintenance plan, and the filter element maintenance plan may be sent to the smart gas data center.

In some embodiments of the present disclosure, by combining the actual working conditions of the filter element under different gas intake conditions, the replacement cycle of the filter element is determined, and it is accurately determined whether the filter element needs to be cleaned or replaced according to the replacement cycle of the filter element. Compared with replacing the filter element at the same time, the loss of individual filter elements that do not need to be replaced can be reduced, and at the same time, the filter element that has reached the replacement cycle can be replaced in time to avoid the impact on normal filtration.

In some embodiments, the smart gas pipeline network device management sub-platform may also determine the filter element maintenance plan based on the cleaning cost. The smart gas pipeline network device management sub-platform may compare the cleaning cost with replacement cost of the filter element to determine the filter element maintenance plan. The replacement cost refers to an economic cost of replacing a new filter element. The replacement cost may be obtained by querying the database according to the type of the filter element. For example, when the cleaning cost is less than the replacement cost, the smart gas device management sub-platform may determine to clean the filter element. When the cleaning cost is greater than or equal to the replacement cost, the smart gas device management sub-platform may determine to replace the filter element.

In some embodiments of the present disclosure, the corresponding filter element maintenance plan is determined by comprehensively analyzing the cleaning cost. When the cleaning cost of the filter element is too high, the filter element may be directly replaced at this time to avoid the waste of manpower and material resources caused by unnecessary cleaning, and reduce the maintenance cost of the filter element.

Step 230, sending, by the smart gas data center, the filter element maintenance plan to the smart gas user platform through the smart gas service platform.

In some embodiments, the smart gas data center may send the filter element maintenance plan to a target terminal (e.g., a terminal of the staff responsible for cleaning or replacing the filter element, etc.) and/or the platform based on a determined result of whether to clean or replace the filter element. The sending form may include, but be not limited to, a combination of one or more forms such as data instructions, alarms, short messages, text pushes, images, videos, voices, and broadcasts.

The methods described in some embodiments of the present disclosure may combine gas intake features of different gas gate stations with the actual working conditions of the filter element to analyze the usage information of the filter element to determine whether the filter element needs to be cleaned or replaced, so as to maintain the filter element in time and ensure the normal operation of the filter element and the normal gas supply of the gate station.

Figure 3:
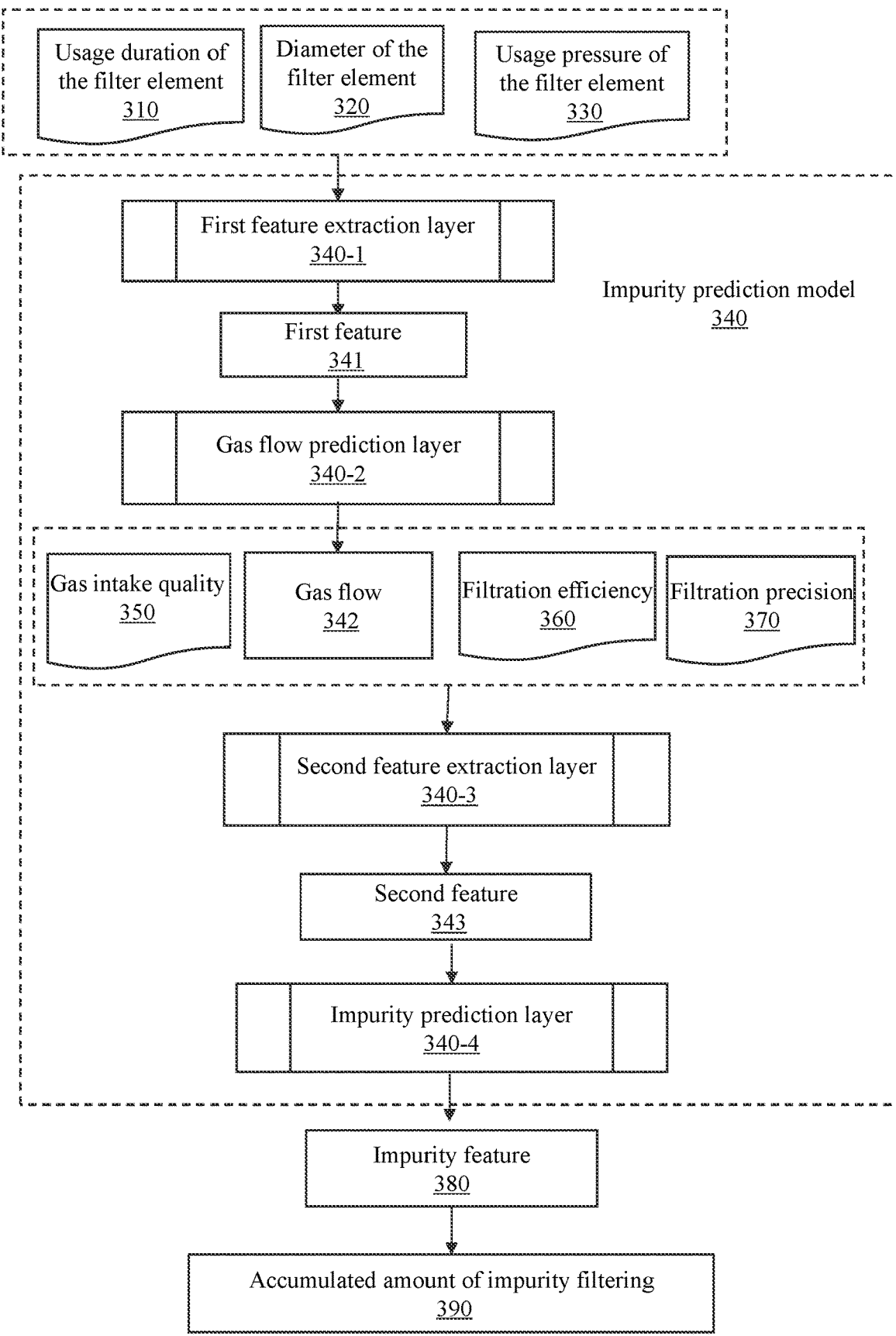
FIG. 3 is a schematic diagram illustrating an exemplary process for determining an accumulated amount of impurity filtering according to some embodiments of the present disclosure.

FIG. 3 is a schematic diagram illustrating an exemplary process for determining an accumulated amount of impurity filtering according to some embodiments of the present disclosure.

In some embodiments, the smart gas pipeline network device management sub-platform may determine an impurity feature based on the impurity prediction model, and determine the accumulated amount of impurity filtering based on the impurity feature.

The impurity prediction model may be used to determine the feature of the impurity filtered by the filter element. In some embodiments, the impurity prediction model is a machine learning model. For example, the impurity prediction model may be a combination of one or more of a Convolutional Neural Network (CNN), a Deep Neural Network (DNN), etc.

In some embodiments, the impurity prediction model may comprise a plurality of processing layers. As shown in FIG. 3, the impurity prediction model 340 may include a first feature extraction layer 340-1, a gas flow prediction layer 340-2, a second feature extraction layer 340-3, and an impurity prediction layer 340-4.

The first feature is obtained by processing the usage duration, a diameter and a usage pressure of the filter element based on the first extraction layer. The first feature may refer to a feature obtained after performing a feature extraction on the usage duration, diameter and usage pressure of the filter element. The diameter of the filter element may be directly determined according to the type of the filter element, for example, DN 15 means that the diameter is 15 mm. The larger the diameter of the filter element is, the larger the gas flow that may pass through is. The usage pressure of the filter element may also be directly determined according to the type of the filter element. The greater the pressure of the filter element is, the greater the gas flow that may pass through is.

The first feature extraction layer may be a machine learning model such as a convolutional neural network. As shown in FIG. 3, the input of the first feature extraction layer 340-1 may include the usage duration 310 of the filter element, the diameter 320 of the filter element, and the usage pressure 330 of the filter element, and the output of the first feature extraction layer 340-1 may be the first feature 341.

The gas flow prediction layer may process the first feature to determine the gas flow. The gas flow may refer to a total amount of gas passing through the filter element within a period of time (such as a unit time).

The gas flow prediction layer may be a machine learning model such as a deep neural network. As shown in FIG. 3, the input of the gas flow prediction layer 340-2 may include the first feature 341 and the output of the gas flow prediction layer 340-2 may be the gas flow 342.

The second feature is obtained by processing the gas flow, the gas intake quality, the filtration efficiency, and the filtration precision based on the second extraction layer. The gas intake quality may reflect the impurities of the intake gas source (for example, the type and content of impurities in the intake gas source, the size and proportion of impurities particles, etc.). The gas intake quality may be determined based on the parameters provided by the gas source manufacturer. The filtration efficiency refers to a degree to which the filter element removes impurity. For example, filtration efficiency of 99% means that 99% of impurities are filtered out. The filtration precision may refer to a size of the largest particle that the filter element allows to pass. For example, filtration precision of 0.3 um means that impurities with a particle diameter less than 0.3 um cannot be filtered out. The filtration efficiency and filtration precision may be determined based on the type parameters of the filter element. The second feature may refer to a feature obtained after performing a feature extraction on the gas flow, gas intake quality, filtration efficiency, and filtration precision.

The second feature extraction layer may be a machine learning model such as a Convolutional Neural Network. As shown in FIG. 3, the input of the second feature extraction layer 340-3 may include gas flow 342, gas intake quality 350, filtration efficiency 360, and filtration precision 370, and the output of the second feature extraction layer 340-3 may be the second feature 343.

The impurity prediction layer may process the first feature to determine the impurity feature. The impurity feature may include information such as particle size, quality, and type of impurity.

The impurity prediction layer may be a machine learning model such as a Deep Neural Network. As shown in FIG. 3, the input of the impurity prediction layer 340-4 may be the second feature 343 and the output of the impurity prediction layer 340-4 may be the impurity feature 380.

In some embodiments, the first feature extraction layer 340-1 and the gas flow prediction layer 340-2 may be obtained through joint training. The training samples include the historical usage duration of the sample filter element, the diameter of the sample filter element, and the usage pressure of the sample filter element. The label may be an actual gas flow of the sample filter element. For example, training samples may be input into an initial first feature extraction layer, then the output of the initial first feature extraction layer may be input into an initial gas flow prediction layer, and a loss function may be constructed based on the output of the initial gas flow prediction layer and the label. Based on the loss function, the parameters of the initial first feature extraction layer and the initial gas flow layer are iteratively updated until preset conditions are met, and a trained first feature extraction layer 340-1 and a trained gas flow prediction layer 340-2 are obtained. The preset conditions may include but are not limited to, the loss function converging, the loss function value being less than a preset value, or the number of training iterations reaching a number threshold.

In some embodiments, the second feature extraction layer 340-3 and the impurity prediction layer 340-4 may be obtained through joint training. The training sample includes the historical gas flow of the sample filter element, the historical gas intake quality of the sample filter element, the filtration efficiency of the sample filter element and the filtration precision of the sample filter element, and the label may be an actual impurity feature of the sample filter element. For example, training samples may be input into an initial second feature extraction layer, then the output of the initial second feature extraction layer may be input into an initial impurity prediction layer, and a loss function may be constructed based on the output and the label of the initial impurity prediction layer. Based on the loss function, the parameters of the initial second feature extraction layer and the initial impurity layer are iteratively updated until preset conditions are met, and a trained second feature extraction layer 340-3 and a trained impurity prediction layer 340-4 are obtained. The preset conditions may include but are not limited to, the loss function converging, the loss function value being less than a preset value, or the number of training iterations reaching a number threshold.

In some embodiments, the trained first feature extraction layer 340-1, the trained gas flow prediction layer 340-2, the trained second feature extraction layer 340-3, and the trained impurity prediction layer 340-4 may compose an impurity prediction model 340.

In some embodiments of the present disclosure, the filter element information and gas information are processed through a multi-layer structure of the model, and the features of the filtered impurity may be predicted based on the actual working conditions of the filter element and different gas intake quality conditions, thereby determining the accumulated amount of impurity filtering more quickly and accurately.

In some embodiments, the smart gas pipeline network device management sub-platform may determine the accumulated amount 390 of impurity filtering based on the impurity feature 380. For example, the accumulated amount of impurity filtering may be a sum of the masses of impurity particles of different types and sizes in the impurity feature. For example, the accumulated amount of impurity filtering corresponding to the impurity feature (droplet impurity, 0.3-0.8 um, 0.5 g; solid impurity, 0.3-0.8 um, 0.8 g; solid impurity, >0.8 um, 1 g) is 2.3 g (0.5+0.8+1=2.3 g).

In some embodiments of the present disclosure, the impurity features can be more accurately determined through the model, thereby determining the accumulated amount of impurity filtering, which is convenient for subsequent determination of whether to clean or replace the filter element, thereby ensuring the normal operation of the filter element.

Figure 4:
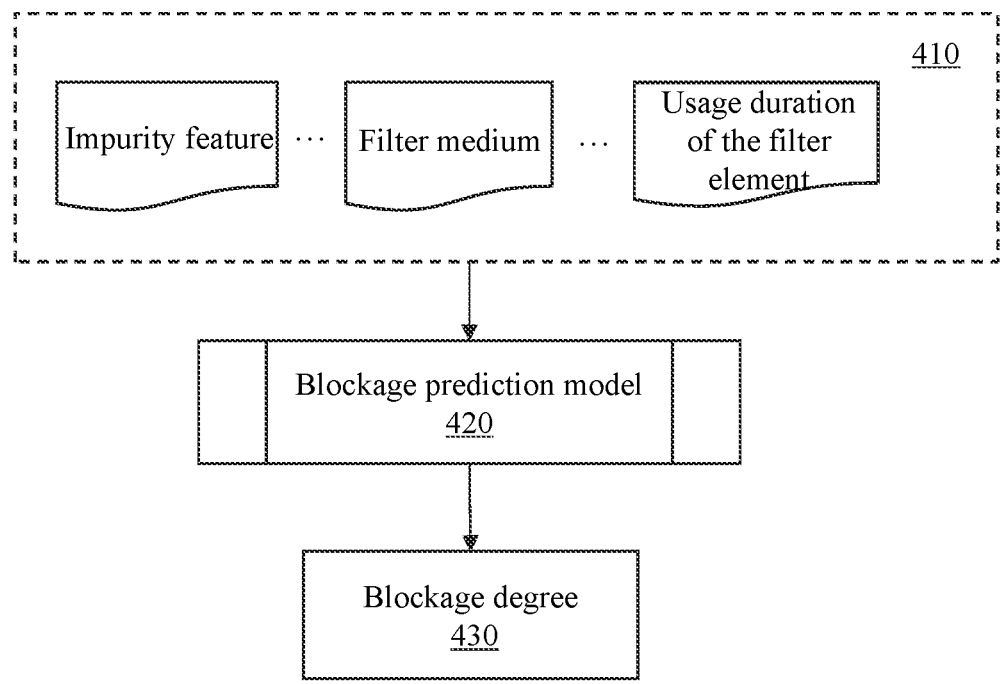
FIG. 4 is a schematic diagram illustrating an exemplary process for determining a blockage degree according to some embodiments of the present disclosure.

FIG. 4 is a schematic diagram illustrating an exemplary process for determining a blockage degree according to some embodiments of the present disclosure.

In some embodiments, the smart gas pipeline network device management sub-platform may determine a blockage degree by processing the impurity feature, a filter medium, and the usage duration of the filter element based on a blockage prediction model.

The blockage prediction model may be used to determine the blockage degree of a filter element. In some embodiments, the blockage prediction model is a machine learning model. For example, the blockage prediction model may be a combination of one or more of a Neural Networks model (NN), a Deep Neural Networks model (DNN), etc.

As shown in FIG. 4, the input 410 of the blockage prediction model 420 includes the impurity feature, filter medium, the usage duration of the filter element, etc., and the output of the blockage prediction model 420 includes the blockage degree 430. For example, the filter medium may be at least one of porous plastic, metal powder sintered tube, ceramic powder sintered tube, or the like.

In some embodiments, the blockage prediction model may be trained based on the plurality of groups of training samples with labels. For example, the training samples may be input into an initial blockage prediction model to determine the output of the initial blockage prediction model, a loss function may be constructed based on the output of the initial blockage prediction and the label, and the parameters of the initial blockage prediction may be iteratively updated based on the loss function until the training is completed when preset conditions are met. The preset conditions may be that the result of the loss function converges or is smaller than a preset threshold, or the like.

In some embodiments, a group of training samples may include the impurity feature, the filter medium, the usage duration of the filter element in historical filter data, or the like. The label may include the blockage degree corresponding to the historical filter data. The label-obtaining method may be manual marking or other methods, which are not limited in this embodiment.

In some embodiments, the blockage degree may also be obtained in other ways, which is not limited here.

In some embodiments of the present disclosure, the actual filtration situation is processed through the model, so that the blockage degree can be more accurately determined, which is convenient for subsequent determination of whether to clean or replace the filter element.

Figure 5:
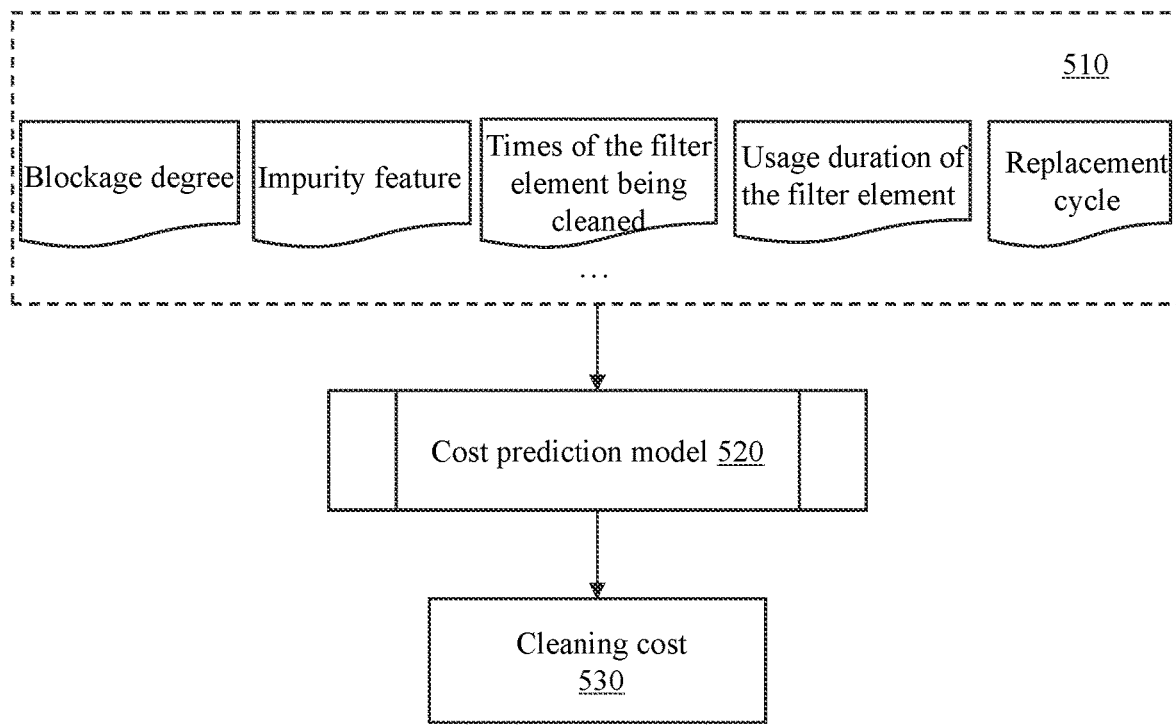
FIG. 5 is a schematic diagram illustrating an exemplary process for determining a cleaning cost according to some embodiments of the present disclosure.

FIG. 5 is a schematic diagram illustrating an exemplary process for determining a cleaning cost according to some embodiments of the present disclosure.

In some embodiments, the smart gas pipeline network device management sub-platform may determine the cleaning cost based on processing the blockage degree, the impurity feature, the times of the filter element being cleaned, the usage duration of the filter element, and the replacement cycle by a cost prediction model.

The cost prediction model may be used to determine the cleaning cost of cleaning the filter element. In some embodiments, the cost prediction model is a machine learning model. For example, the cost prediction model may be may be a combination of one or more of a Neural Networks model (NN), a Deep Neural Networks model (DNN), etc.

As shown in FIG. 5, the input 510 of the cost prediction model 520 may include the blockage degree, the impurity feature, the times of the filter element being cleaned, the usage duration of the filter element, the replacement cycle, etc., and the output of the cost prediction model 520 may include the cleaning cost 530, or the like. The times of the filter element being cleaned refers to the times the filter element being cleaned from the starting time of usage to the present time.

In some embodiments, the cost prediction model may be trained based on the plurality of groups of training samples with labels. For example, the training samples may be put into an initial cost prediction model to determine the output of the initial cost prediction model, a loss function may be constructed based on the output of initial cost prediction model and the label, and the parameters of the initial cost prediction model may be iteratively updated based on the loss function until the training is completed when preset conditions are met. The preset conditions may be that the result of the loss function converges or is smaller than a preset threshold, or the like.

In some embodiments, a group of training samples may include historical filtration data (including the blockage degree, the impurity feature, the usage duration of the filter element, etc.) and historical cleaning data (including the times of the filter element being cleaned, the replacement cycle, etc.). The training label may be the corresponding cleaning cost. When the times of the filter element being cleaned in the historical cleaning data is greater than 0, the corresponding cleaning cost is the cost of the actual cleaning. When the times of the filter element being cleaned in the historical cleaning data is 0 (that is, the filter element is cleaned, but replaced directly), the corresponding cleaning cost is the replacement cost of the new filter element. The label-obtaining method may be manual marking or may be other methods, which are not limited in this embodiment.

In some embodiments of the present disclosure, the model can combine the actual working conditions of the filter element to more accurately determine the cleaning cost, which is convenient for subsequent determination of whether to clean or replace the filter element.

One or more embodiments of the present disclosure further provide a non-transitory computer-readable storage medium, the storage medium stores computer instructions, and after the computer reads the computer instructions in the storage medium, the computer executes the method for predicting the filter element replacement at the gate station for smart gas according to any embodiments mentioned above.

The basic concepts have been described above. Obviously, for those skilled in the art, the above detailed disclosure is only an example, and does not constitute a limitation on the present disclosure. Although not explicitly described herein, various modifications, improvements, and corrections to the present disclosure may occur to those skilled in the art. Such modifications, improvements, and corrections are suggested in the present disclosure, so such modifications, improvements, and corrections still belong to the spirit and scope of the exemplary embodiments of the present disclosure.

Meanwhile, the present disclosure uses specific words to describe the embodiments of the present disclosure. Such as "one embodiment," "an embodiment," and/or "some embodiments" mean a certain feature, structure, or characteristic associated with at least one embodiment of the present disclosure. Therefore, it should be emphasized and noted that two or more references to "an embodiment", "one embodiment" or "an alternative embodiment" in various places in the present disclosure are not necessarily referred to the same embodiment. Furthermore, certain features, structures or characteristics of one or more embodiments of the present disclosure may be combined as appropriate.

Furthermore, unless explicitly stated in the claims, the order of processing elements and sequences described in the present disclosure, the use of alphanumerics, or the use of other names is not intended to limit the order of the processes and methods of the present disclosure. While the foregoing disclosure discusses by way of various examples some embodiments of the invention presently believed to be useful, it is to be understood that such details are for purposes of illustration only and that the appended claims are not limited to the disclosed embodiments, but rather the requirements are intended to cover all modifications and equivalent combinations that fall within the spirit and scope of the embodiments of the present disclosure. For example, although the system components described above may be implemented by hardware devices, they may also be implemented by software-only solutions, such as installing the described systems on existing servers or mobile devices.

Similarly, it should be noted that, in order to simplify the expressions disclosed in the present disclosure and thus help the understanding of one or more embodiments of the present disclosure, in the foregoing description of the embodiments of the present disclosure, various features may sometimes be combined into one embodiment, in the drawings or descriptions thereof. However, this method of disclosure does not imply that the subject matter of the description requires more features than are recited in the claims. Indeed, there are fewer features of an embodiment than all of the features of a single embodiment disclosed above.

Some examples use numbers to describe quantities of ingredients and attributes, it should be understood that such numbers used in the description of embodiments are modified by modifiers "about", "approximately" or "substantially" in some examples. Unless stated otherwise, "about", "approximately" or "substantially" means that a variation of ±20% is allowed for the stated number. Accordingly, in some embodiments, the numerical parameters set forth in the present disclosure and claims are approximations that can vary depending on the desired features of individual embodiments. In some embodiments, the numerical parameters should take into account the specified significant digits and use a general digit reservation method. Notwithstanding that the numerical fields and parameters used in some embodiments of the present disclosure to confirm the breadth of their ranges are approximations, in specific embodiments such numerical values are set as precisely as practicable.

For each patent, patent application, patent application publication, and other material, such as article, book, specification, publication, document, etc., cited in the present disclosure, the entire contents of which are hereby incorporated by reference into the present disclosure are hereby incorporated by reference. Application history documents that are inconsistent with or conflict with the contents of the present disclosure are excluded, as are documents (currently or hereafter appended to the present disclosure) limiting the broadest scope of the claims of the present disclosure. It should be noted that, if there is any inconsistency or conflict between the descriptions, definitions, and/or usage of terms in the accompanying materials of the present disclosure and the contents of the present disclosure, the descriptions, definitions and/or usage of terms in the present disclosure shall prevail.

Finally, it should be understood that the embodiments described in the present disclosure are only used to illustrate the principles of the embodiments of the present disclosure. Other variations are also possible within the scope of the present disclosure. Accordingly, by way of example and not limitation, alternative configurations of the embodiments of the present disclosure may be considered consistent with the teachings of the present disclosure. Accordingly, the embodiments of the present disclosure are not limited to those expressly introduced and described in the present disclosure.

What is claimed is:

1. A method for predicting a filter element replacement at a gate station, wherein the method is implemented by an Internet of Things system for predicting the filter element replacement at the gate station, and the Internet of Things system includes a user platform, a service platform, a device management platform, a sensor network platform, and an object platform that interact in sequence, the device management platform includes a data center and a pipeline network device management sub-platform, and the method is executed by the device management platform, comprising:

obtaining, by the data center, usage information of the filter element through the sensor network platform, wherein the usage information at least includes at least one of ventilation efficiency of the filter element, filtered impurity information, and a blockage degree;
obtaining, by the pipeline network device management sub-platform, the usage information from the data center, determining a filter element maintenance plan based on the usage information, and sending the filter element maintenance plan to the data center;
sending, by the data center, the filter element maintenance plan to the user platform through the service platform; and
replacing the filter element according to the filter element maintenance plan,
wherein the filtered impurity information includes an accumulated amount of impurity filtering; and
the determining a filter element maintenance plan based on the usage information includes:
obtaining the accumulated amount of impurity filtering; and
determining the filter element maintenance plan based on the accumulated amount of impurity filtering;
wherein the obtaining the accumulated amount of impurity filtering includes:
determining an impurity feature based on an impurity prediction model, and determining the accumulated amount of impurity filtering based on the impurity feature, the impurity prediction model being a machine learning model including:
a first feature extraction layer, a gas flow prediction layer, a second feature extraction layer, and an impurity prediction layer, wherein
the first feature extraction layer is configured to obtain a first feature by processing usage duration, a diameter, and a usage pressure of the filter element;
the gas flow prediction layer is configured to determine a gas flow by processing the first feature, the gas flow being a total amount of gas passing through the filter element within a period of time;
the second feature extraction layer is configured to obtain a second feature by processing the gas flow, a gas intake quality, a filtration efficiency, and a filtration precision; and the impurity prediction layer is configured to determine the impurity feature by processing the second feature;
wherein the first feature extraction layer and the gas flow prediction layer are obtained through joint training based on first training samples and a first label, wherein the first training samples include historical usage duration of sample filter element, diameter of the sample filter element, and usage pressure of the sample filter element and the first label includes an actual gas flow of the sample filter element, the joint training including:
inputting the first training samples into an initial first feature extraction layer and obtaining an output of the initial first feature extraction layer;
inputting the output of the initial first feature extraction layer into an initial gas flow prediction layer and obtaining an output of the initial gas flow prediction layer;
constructing a loss function based on the output of the initial gas flow prediction layer and the first label;

updating parameters of the initial first feature extraction layer and the initial gas flow prediction layer iteratively based on the loss function until a first preset condition is met; and
obtaining the first feature extraction layer and the gas flow prediction layer;
wherein the second feature extraction layer and the impurity prediction layer are obtained through joint training based on second training samples and a second label, wherein the second training samples include historical gas flow of sample filter element, historical gas intake quality of the sample filter element, filtration efficiency of the sample filter element, and filtration precision of the sample filter element, and the second label includes an actual impurity feature of the sample filter element, the joint training including:
inputting the second training samples into an initial second feature extraction layer and obtaining an output of the initial second feature extraction layer;
inputting the output of the initial second feature extraction layer into an initial impurity prediction layer and obtaining an output of the initial impurity prediction layer;
constructing a loss function based on the output of initial impurity prediction layer and the second label;
updating parameters of the initial second feature extraction layer and the initial impurity prediction layer iteratively based on the loss function until a second preset condition is met; and
obtaining the second feature extraction layer and the impurity prediction layer.

2. The method for predicting the filter element replacement at the gate station according to claim 1, wherein the obtaining usage information of the filter element includes:
obtaining the ventilation efficiency of the filter element based on a pressure difference between a gas inlet and a gas outlet of the filter element.

3. The method for predicting the filter element replacement at the gate station according to claim 1, wherein the usage information further includes a cleaning cost; and
the determining a filter element maintenance plan based on the usage information includes:
obtaining the cleaning cost; and
determining the filter element maintenance plan based on the cleaning cost.

4. An Internet of Things system for predicting a filter element replacement at a gate station for smart gas, comprising a user platform, a service platform, a device management platform, a sensor network platform, and a object platform that interact in sequence, wherein the device management platform includes a data center and a pipeline network device management sub-platform, and the device management platform is configured to:
obtain, by the data center, usage information of the filter element through the sensor network platform, wherein the usage information at least includes at least one of ventilation efficiency of the filter element, filtered impurity information, and a blockage degree;
obtain, by the pipeline network device management sub-platform, the usage information from the data center, determine a filter element maintenance plan based on the usage information, and send the filter element maintenance plan to the data center;

send, by the data center, the filter element maintenance plan to the user platform through the service platform; and replace the filter element according to the filter element maintenance plan wherein the filtered impurity information includes an accumulated amount of impurity filtering; and to determine a filter element maintenance plan based on the usage information, the device management platform is further configured to:

obtain the accumulated amount of impurity filtering; and determine the filter element maintenance plan based on the accumulated amount of impurity filtering;

wherein to obtain the accumulated amount of impurity filtering, the device management platform is further configured to:

determine an impurity feature based on an impurity prediction model, and determine the accumulated amount of impurity filtering based on the impurity feature, the impurity prediction model being a machine learning model including:

a first feature extraction layer, a gas flow prediction layer, a second feature extraction layer, and an impurity prediction layer, wherein the first feature extraction layer is configured to obtain a first feature by processing usage duration, a diameter, and a usage pressure of the filter element;

the gas flow prediction layer is configured to determine a gas flow by processing the first feature, the gas flow being a total amount of gas passing through the filter element within a period of time;

the second feature extraction layer is configured to obtain a second feature by processing the gas flow, a gas intake quality, a filtration efficiency, and a filtration precision; and the impurity prediction layer is configured to determine the impurity feature by processing the second feature;

wherein the first feature extraction layer and the gas flow prediction layer are obtained through joint training based on first training samples and a first label, wherein the first training samples include historical usage duration of sample filter element, diameter of the sample filter element, and usage pressure of the sample filter element and the first label includes an actual gas flow of the sample filter element, the joint training including:

inputting the first training samples into an initial first feature extraction layer and obtaining an output of the initial first feature extraction layer;

inputting the output of the initial first feature extraction layer into an initial gas flow prediction layer and obtaining an output of the initial gas flow prediction layer;

constructing a loss function based on the output of the initial gas flow prediction layer and the first label;

updating parameters of the initial first feature extraction layer and the initial gas flow prediction layer iteratively based on the loss function until a first preset condition is met; and obtaining the first feature extraction layer and the gas flow prediction layer;

wherein the second feature extraction layer and the impurity prediction layer are obtained through joint training based on second training samples and a second label, wherein the second training samples include historical gas flow of sample filter element, historical gas intake quality of the sample filter element, filtration efficiency of the sample filter element, and filtration precision of the sample filter element, and the second label includes an actual impurity feature of the sample filter element, the joint training including:

inputting the second training samples into an initial second feature extraction layer and obtaining an output of the initial second feature extraction layer;

inputting the output of the initial second feature extraction layer into an initial impurity prediction layer and obtaining an output of the initial impurity prediction layer;

constructing a loss function based on the output of initial impurity prediction layer and the second label;

updating parameters of the initial second feature extraction layer and the initial impurity prediction layer iteratively based on the loss function until a second preset condition is met; and obtaining the second feature extraction layer and the impurity prediction layer.

5. The Internet of Things system for predicting the filter element replacement at the gate station according to claim 4, wherein to obtain the usage information of the filter element, the pipeline network device management sub-platform is configured to:

obtain the ventilation efficiency of the filter element based on a pressure difference between a gas inlet and a gas outlet of the filter element.

6. The Internet of Things system for predicting the filter element replacement at the gate station according to claim 4, wherein the usage information further includes a cleaning cost; and to determine a filter element maintenance plan based on the usage information, the pipeline network device management sub-platform is configured to:

obtain the cleaning cost; and determine the filter element maintenance plan based on the cleaning cost.

7. A non-transitory computer-readable storage medium storing computer instructions, wherein when reading the computer instructions in the storage medium, a computer implements the method for predicting the filter element replacement at the gate station according to claim 1.

* * * * *